United States Patent [19]
Markovitz

[11] 3,812,214

[45] May 21, 1974

[54] HARDENABLE COMPOSITION CONSISTING OF AN EPOXY RESIN AND A METAL ACETYLACETONATE

[75] Inventor: Mark Markovitz, Schenectady, N.Y.

[73] Assignee: General Electric Company, Schenectady, N.Y.

[22] Filed: Mar. 13, 1973

[21] Appl. No.: 340,796

Related U.S. Application Data

[63] Continuation of Ser. No. 193,551, Oct. 28, 1971, abandoned.

[52] U.S. Cl..... 260/830 TW, 260/2 EP, 260/47 EP, 260/51 EP, 260/78.4 EP
[51] Int. Cl............................................ C08g 45/00
[58] Field of Search.......... 260/47 EP, 47 EC, 2 EP, 260/2 EC, 51 EP, 78.4 EP, 830 TW

[56] References Cited
UNITED STATES PATENTS
2,801,228  7/1957  Starck et al........................... 260/47
2,876,208  3/1959  Naps.............................. 260/47 EC

*Primary Examiner*—William H. Short
*Assistant Examiner*—T. Pertilla
*Attorney, Agent, or Firm*—John F. Ahern; James W. Mitchell

[57] ABSTRACT

The cure rate of 1,2-epoxy resins containing more than one epoxy group per molecule can be controlled over a wide range of times by a catalytic hardener comprising from 0.025 to 5.0 percent based on the weight of the epoxy resin of a metal acetylacetonate and up to 15.0 percent by weight of the epoxy resin of a phenolic accelerator.

7 Claims, No Drawings

HARDENABLE COMPOSITION CONSISTING OF AN EPOXY RESIN AND A METAL ACETYLACETONATE

This is a continuation of application Ser. No. 193,551, filed 10/28/71, and now abandoned.

This invention relates to epoxy resins, and more specifically to epoxy resins whose curing or hardening rate may be controlled over a broad range of times by the use of certain catalytic hardeners, or catalytic hardeners in combination with an accelerator.

There are many epoxy resin hardeners currently in use. Among the most common are the aromatic polyamines, aliphatic polyamines and their adducts, carboxylic acid anhydrides, polyamides and catalytic curing agents, as for example tertiary amines, imidazoles, $BF_3$ monoethylamine, and dicyandiamide. These hardeners have many useful properties, but each has its limitations. For example, epoxy resins cured with polyamines and polyamides are very reactive towards certain types of epoxy resins and cure very rapidly, but the cured product normally has poor electrical insulation properties. The pot life of epoxyanhydride resins is usually relatively short at room temperature. The catalytic curing agents are normally limited by their very high reactivity at the cure temperature and by the poor high temperature electrical properties of the cured resins. A characteristic of almost all of the hardeners for epoxy resins is that their reactivity can be controlled only over a very narrow range.

It is an object of the present invention to provide a hardener for epoxy resins, the reactivity of which can be controlled over a very wide range, i.e., from instant gelation to stability for more than one year. It is an additional object of this invention to provide a class of hardeners for epoxy resins which combine a large number of additional desirable properties, including very favorable chemical and outstanding electrical properties in the resultant cross-linked resin.

These and other objects of the invention are achieved by the utilization as a catalytic hardening agent for the epoxy resin of a metal acetylacetonate in quantities of from about 0.025 to 5.0 percent by weight of the epoxy resin. Alternatively, both a metal acetylacetonate and up to 15.0 percent by weight of a phenolic accelerator may be used. Epoxy resin compositions containing the present hardeners possess a reactivity that can be controlled over an extremely wide range, from instant gelation to stability for more than one year — both at room temperature. The control of reactivity may be affected by the choice of specific metal acetylacetonate, by the use of and the choice of specific phenolic accelerator in combination with the metal acetylacetonate, and by the amount of the acetylacetonate or phenolic accelerator that is used.

In addition to controlled reactivity, the catalytic hardeners of the present invention possess a number of additional desirable characteristics. They are not decomposed or hydrolyzed by moisture, as is the case with known acid anhydrides and boron trifluoride-amine curing agents. The hardening agents are useful with an tremely broad class of epoxy resins; their usefulness is not limited to a specific type of epoxy resin as in the case of amines, carboxylic acid anhydrides and conventional catalytic curing agents. They have a low order of toxicity hazard, a low dermatitis potential and a very low vapor pressure. The cured epoxy resins have a polyether structure, which makes them resistant to hydrolysis and chemical attack. In addition, the cured resins are tough, have good electrical properties to at least 170° C. and exhibit good heat-aging properties.

The metal acetylacetonates of the present invention can be characterized by the following structural formula:

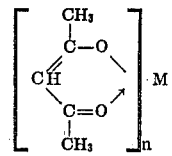

where M is a metal ion and $n$ is 1 to 4 corresponding to the valence number of the metal ion. Included within the scope of the invention are metal acetylacetonates in which one or more hydrogen atoms of the methyl or methylene groups are substituted by a halogen atom or by an alkyl, aryl, or an alkaryl substituent. An example of a halogen-substituted metal acetylacetonate is a metal hexafluoroacetylacetonate or trifluoracetylacetonate. An example of an alkyl-substituted acetylacetonate is dipivaloylethane in which the three hydrogen atoms on each of the methyl groups are substituted with a methyl group. The catalytic hardeners of the present invention should not be confused with similar compositions containing a labile halogen atom. In the present compositions, the halogens, if present, are attached directly to a carbon atom of the methylene or methyl groups and are therefore extremely stable. Labile halogen atoms in epoxy resin curing agents normally form halogen acids, and the presence of such an ionic constituent in the cured resin would raise many problems, including poor electrical properties.

Metal acetylacetonates in which the metal is aluminum, titanium, zinc or zirconium are a particularly preferred class of metal acetylacetonates within the scope of the invention. However, essentially any metallic acetylacetonate may be used, including those of aluminum, barium, beryllium, cadmium, calcium, cerous, chromic, cobaltic, cobaltous, cupric, ferric, ferrous, gallium, hafnium, indium, lead, lithium, magnesium, manganic, manganous, molybdenum, molybdenyl, nickel, palladium, platinum, potassium, rhodium, rubidium, ruthenium, sodium, strontium, thallium, thorium, titanium, tungstyl, uranyl, vanadium, vanadyl, zinc, and zirconium, Acetylacetonates of the rare earth elements, scandium, cerium, yttrium, lanthanum, praseodymium, neodymium, samarium, europium, gadolinium, terbium, dysprosium, holmium, erbium, thulium, ytterbium, and lutetium are known and can reasonably be expected to be useful in the practice of the present invention.

The metal acetylacetonates are used in small catalytic quantities from 0.025 to 5.0 percent, based upon the weight of the epoxy resin. Optimum results have been achieved with from 0.05 to 3.0 percent. It is important to note that the acetylacetonates of the invention are catalytic hardeners, which do not in a significant way become a part of the hardened epoxy molecule as do curing agents added in much larger or near stoichiometric amounts.

Among the phenolic accelerators which can be effectively used in this invention are bisphenol A (i.e., 2,2- bis(4-hydroxyphenyl) propane), pyrogallol, dihydroxydiphenyls as well as ortho-, meta-, and para- hydroxybenzaldehydes (such as salicylaldehyde), catechol, resorcinol, hydroquinone, and phenol-formaldehyde and resorcinol-formaldehyde condensates. Examples of other phenolic accelerators suitably employed in this invention also include halogenated phenols such as ortho-, meta-, and para- chlorophenols or bromophenols, and ortho-, meta-, and para- nitrophenols. The phenolic accelerator may be present in concentrations ranging from zero to 15 percent by weight of the epoxy resin. The amount will normally range for 0.1 to 15 percent, with optimum cure rates being produced with phenolic accelerator concentrations between 0.5 and 10 percent by weight of the epoxy resin. As in the case of the acetylacetonate, the phenolics are added in relatively small amounts because they are accelerators or catalysts rather than curing agents of the stoichiometric type which form a significant reaction with the epoxy resin and become a significant part of the epoxy molecule.

The epoxy resin employed in this invention can be any 1,2-epoxy resin having more than 1 epoxy group per molecule and includes cycloaliphatic epoxy resins, such as 3,4-epoxycyclohexylmethyl-(3,4-epoxy) cyclohexane carboxylate (sold under the trademarks ERL 4221 by Union Carbide Plastics Company or Araldite CY 179 by Ciba Products Company), bis(3,4-epoxy-6-methylcyclohexylmethyl) adipate (sold under the trademarks ERL 4289 by Union Carbide Plastics Company or Araldite CY 178 by Ciba Products Company), vinylcyclohexene dioxide (ERL 4206 made by Union Carbide Plastics Company), bis(2,3-epoxycyclopentyl) ether resins (sold under the trademark ERL 4205 by Union Carbide Plastics Company), 2-(3,4-epoxy) cyclohexyl-5,5-spiro (3,4-epoxy)-cyclohexane-m-dioxane (sold under the trademark Araldite CY 175 by Ciba Products Company); glycidyl ethers of polyphenol epoxy resins, such as liquid or solid bisphenol A diglycidyl ether epoxy resins (such as those sold under trademarks as Epon 826, Epon 828, Epon 830, Epon 1001, Epon 1002, Epon 1004, etc. by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under the trademarks ECN 1235, ECN 1273, ECN 1280 and ECN 1299 by Ciba Products Company), resorcinol glycidyl ether (such as ERE 1359 made by Ciba Products Company), tetraglycidoxy tetraphenylethane (Epon 1031 made by Shell Chemical Company); glycidyl ester epoxy resins such as diglycidyl phthalate (ED–5661 by Celanese Resins Company), diglycidyl tetrahydrophthalate (Araldite CY 182 by Ciba Products Company) and diglycidyl hexahydrophthalate (Araldite CY 183 made by Ciba Products Company or ED–5662 made by Celanese Resins Company); and flame retardant epoxy resins such as halogen containing bisphenol A diglycidyl ether epoxy resins (e.g., DER 542 and DER 511 which have bromine contents of 44–48 and 18–20%, respectively, and are made by Dow Chemical Company).

The foregoing epoxy resins are well known in the art and are set forth, for example, in many patents including U.S. Pat. Nos. 2,324,483, 2,444,333, 2,494,295, 2,500,600 and 2,511,913. Moreover, it often is advantageous to employ mixtures of these epoxy resins, e.g., a glycidyl ether epoxy resin such as Epon 828 with a cycloaliphatic epoxy resin such as ERL 4221, to control the cure rate of the thermosetting resin. The hardeners of this invention are not only effective with various epoxy resins and mixtures of epoxy resins, but they are also effective in mixtures containing reactive and nonreactive epoxy diluents (or extenders), epoxy flexibilizers and fillers. Thus, while epoxy resin hardeners of the prior art are effective with only a select group of epoxy resins, the epoxy resin hardeners of this invention (to be more fully explained hereinafter) are effective for cross-linking all groups of epoxy resins.

The resin may be mixed with the acetylacetonate catalytic hardener in any conventional fashion — either at room temperature or at elevated temperatures. In those cases in which a phenolic accelerator is used, it may be added either before or after the epoxy resin and catalytic hardener are mixed. Alternatively, the acetylacetonate hardening agent may first be mixed with the phenolic accelerator or with more than one phenolic accelerator in various ratios to produce a combined hardening agent having the desired reactivity rate.

The following examples in which all parts and percentages are by weight are divided into several groups. The first group, Examples 1 thru 21, illustrate the relative times for gelation of epoxy resins of the invention hardened at room temperature to demonstrate the working life stability of the curing agents and at elevated temperatures to demonstrate their reactivity.

In the first group of examples, reactivity at elevated temperatures was determined by placing 15 grams of the resin in a 2-inch diameter aluminum weighing dish into a 160° C. air-circulating oven and checking for gelation every 5, 10 or 15 minutes. Working life stability was determined by storing the resin solutions at room temperature and checking for viscosity increases or gelation every seven or fourteen days.

EXAMPLE 1

A hundred parts of an ERL 4221 epoxy resin were heated to 100°–160° C. and then 0.25, 0.50, 0.75, 1.0, 2.0 and 3.0 parts successively of aluminum acetylacetonate were added to the epoxy resin. ERL 4221 is an epoxy resin of the structural formula

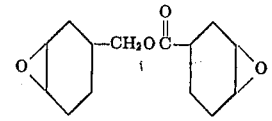

having an epoxide equivalent weight of 126 to 140. The aluminum acetylacetonate dissolved immediately in each case, and clear solutions resulted. In general, these epoxy resins were gelled slowly by the aluminum acetylacetonate hardener, with the fastest gelation occurring with the lower acetylacetonate content. Conversely, higher reactivity was obtained with decreasing acetylacetonate content. Specifically, gel times at 160° C. were 200 minutes with 0.25, 0.50 and 0.75 parts of the acetylacetonate, 240 minutes with 1 part of the acetylacetonate, with no gelling at all after 240 minutes with 2 parts or more of the hardener.

EXAMPLE 2

Example 1 was repeated with ERL 4221 epoxy resin and aluminum acetylacetonate as the hardener, except that bisphenol A was added. In each case the reactivity of the ERL 4221-aluminum acetylacetonate resins was increased by the addition of bisphenol A. Shorter gel times were obtained by increasing the bisphenol A content, or by decreasing the acetylacetonate content. Although these resins gelled as rapidly as 10 minutes at 160° C., the resin solutions were still low-viscosity liquids with no major increase in viscosity even after 11 months at room temperature. The gel times at 160° C. ranged from 30 minutes with 0.25 parts of aluminum acetylacetonate and 1 part of bisphenol A to 55 minutes with 3 parts of aluminum acetylacetonate and 1 part of bisphenol A. When the amount of bisphenol A was increased to 2 parts with from 0.25–3 parts of aluminum acetylacetonate, the gel times were as low as 10 minutes or as high as 30 minutes. In all cases, no gelation occurred at room temperature with any of the foregoing combinations of aluminum acetylacetonate and bisphenol A. All of the mixtures remained low-viscosity liquids after at least 11 months at room temperature.

EXAMPLE 3

Example 2 was repeated, except that salicylaldehyde was substituted as the accelerator for the bisphenol A. The aluminum acetylacetonate was added in amounts of 0.25, 0.50, 0.75 and 1.0 parts respectively. To each of these compositions were added first 1 part of salicylaldehyde and then 2 parts of salicylaldehyde. Gel times with 1 part of salicylaldehyde at 160° C. were from 90 to 95 minutes. With 2 parts of salicylaldehyde, gel times were from 100 to 115 minutes. At room temperature, no gelation occurred. The liquids remained low viscosity after at least 10 months at room temperature.

EXAMPLE 4

Solutions were prepared containing 97 percent of ERL 4221 epoxy resin and 3 percent of a solid phenol-formaldehyde novolac. These solutions were heated to 100° C. to dissolve from 0.25 to 3.0 parts of aluminum acetylacetonate per 100 parts of the solution. At 160° C., a violent exotherm occurred after 7 minutes. At 120° C., hard clear solids resulted at gel times ranging from 10 to 15 minutes. In spite of their very great reactivity at elevated temperatures, four of the six resin solutions stored at room temperature were still low-viscosity liquids after 328 days at room temperature. The only gelation that occurred within the 328 days at room temperature were those containing in excess of 1 part of aluminum acetylacetonate.

EXAMPLE 5

To 100 parts of ERL 4221 epoxy resin and from 1 to 2 parts of aluminum acetylacetonate were added from 0.5 to 2 parts of catechol. These resins gelled within 5 minutes at 160° C. and from 15 to 29 days at room temperature.

EXAMPLE 6

A clear solution was obtained by mixing at 100° C. a mixture of salicylaldehyde, aluminum acetylacetonate, and a phenol-formaldehyde novolac in proportions of 60:20:20. This clear solution of liquid hardener was added in proportions of 0.5, 1.0, 2.0 and 3.0 parts to 100 parts of ERL 4221 epoxy resin. In each case gel time occurred in from 25 to 30 minutes at 160° C. The resin solutions stored at room temperature remained low-viscosity liquids in each case after at least 10 months.

EXAMPLE 7

A liquid hardener solution was obtained by heating to 100° C. a 1:1:1 ratio mixture of salicylaldehyde, aluminum acetylacetonate, and catechol until a clear solution resulted. 1.0, 2.5 and 5.0 parts of this hardener solution were added respectively to 100 parts of ERL 4221 epoxy resin. In each case, gel time at 160° C. was 5 to 10 minutes. The stability of these resin solutions varied from at least 10 months for the 1 and 2.5 parts hardener solution to 5 months for the 5 parts hardener solution.

EXAMPLE 8

One hundred parts of Epon 828 epoxy resin were mixed with 1 and 2 parts of aluminum acetylacetonate and then with 1 and 2 parts of aluminum acetylacetonate and 2.5 and 5.0 parts of catechol. Epon 828 is a bisphenol A-diglycidyl ether epoxy resin having an epoxide equivalent weight of from 185 to 192. No gelation occurred at 160° C. with the acetylacetonate alone. Gelation occured in from 10–15 minutes when the catechol accelerator was added. No gelation occurred in any sample after at least 13½ months at room temperature.

EXAMPLE 9

This example illustrates the results with 100 parts of an epoxy novolac resin DEN 438, from 1.0 to 2.0 parts of aluminum acetylacetonate, and from 2.5 to 4.0 parts of catechol. DEN 438 epoxy novolac resin has an epoxide functionality of 3.6 and an epoxide equivalent weight of 175 to 182. The resin solutions stored at room temperature were not gelled after 7 months and had approximately the same semisolid consistency of freshly prepared resin at the end of this period. The DEN 438-aluminum acetylacetonate-catechol solutions gelled after 13 minutes at 160° C. DEN 438-aluminum acetylacetonate solutions containing no catechol or other phenolic compounds did not gel at 160° C.

EXAMPLE 10

To 100 parts by weight of the peracid epoxy resin ERL 4221 were added 0.5, 1.0, 1.5, 2.0 and 2.5 parts respectively of titanium acetylacetonate. In each case the resin solutions gelled at 160° C. in from 15 to 25 minutes. The stability at room temperature ranged from 40 days with the smallest quantity of the catalytic hardener to 61 days with the largest amounts of the catalytic hardener.

EXAMPLE 11

A series of solutions were prepared, each containing two epoxy resins, by mixing from 75 to 60 parts of ERL 4221 epoxy resin with from 25 to 40 parts of Epon 828 epoxy resin. To 100 parts of each of these solutions of mixed epoxy resins were added 2 parts of titanium acetylacetonate. The gel time in each case at 160° C. was from 30 to 45 minutes. The gel time at room temperature ranged from 97 days to 174 days. The reactivity at 160° C. decreased and the working life stability increased as the relative Epon 828 content was increased.

EXAMPLE 12

One hundred parts of Epon 828 epoxy resin, mixed with 2 parts of titanium acetylacetonate, did not gel at 160° C. after 2 hours. When 1 part, and then 2 parts of catechol were added, gelatin occurred after 7 minutes at 160° C. and after 1 day at room temperature.

EXAMPLE 13

ERL 4221 epoxy resin containing from 0.5 to 3.0 parts of zinc acetylacetonate per 100 parts of the epoxy resin did not gel after 3 hours at 160° C. The same solutions to which were added from 1.0 to 4.0 parts of catechol gelled in from 30 to 75 minutes at 160° C. At room temperature, gelatin occurred in from 63 to 159 days while several solutions were still liquids after 159 days.

EXAMPLE 14

Zirconium acetylacetonate was an effective hardener for ERL 4221 epoxy resins in the absence of a phenolic accelerator. It was added to 100 parts of the epoxy resin in amounts of 0.01, 0.025, 0.050, 0.075 and 0.10 parts. Gel time at 160° C. ranged from 35 to 60 minutes with 0.025 parts of the zirconium acetylacetonate to 27 minutes with from 0.075 to 0.10 parts of acetylacetonate. No gelation occurred at 160° C. after 70 minutes with the 0.01 part by weight of the acetylacetonate. Thus, as little as 0.025 part by weight of zirconium acetylacetonate is effective as a hardener for the epoxy resin. At room temperature the mixture exhibited excellent stability; no gelation occurred after at least 13 months at room temperature.

EXAMPLE 15

A hundred parts of ERL 4221 epoxy resins were heated to 120° C. and then amounts ranging from 0.1 to 3.0 parts of powdered zirconium acetylacetonate were added. The mixtures gelled after 25 to 30 minutes at 160° C. At room temperature, gelation occurred after 376 days with 0.10 parts by weight of acetylacetonate. With amounts of acetylacetonate greater than 0.25, no gelation occurred after at least 13 months. The stability at room temperature was significantly longer for the solutions containing 1.0 to 3.0 parts of the zirconium acetylacetonate. At these higher proportions, the solutions at room temperature were low viscosity after 13 months. The solutions containing smaller proportions, although not gelled after 13 months, were viscous liquids at that period. It was further found that it was not necessary to heat the ERL 4221 epoxy resin in order to dissolve the zirconium acetylacetonate. Finely powdered zirconium acetylacetonate dissolved in ERL 4221 at room temperature by agitation of the mixture on paint rollers. The gel time of these solutions was longer than those of the solutions which were heated to dissolve the zirconium acetylacetonate.

EXAMPLE 16

The most convenient method for preparing ERL 4221-zirconium acetylacetonate solutions was to make a liquid concentrate of the zirconium acetylacetonate in Epon 828 epoxy resin. The Epon 828 epoxy resin was not gelled by zirconium acetylacetonate in the absence of phenolic accelerators. Liquid concentrates containing 10 percent and 20 percent of zirconium acetylacetonate in Epon 828 were prepared by heating, with intermittent stirring for 30 to 240 minutes in 100°–160° C. ovens. The resulting liquid concentrates were stable for several days at room temperature before precipitation of the zirconium acetylacetonate began. The liquid concentrate dissolved instantly at room temperature in ERL 4221 to give clear solutions. From 5.0 to 15 parts of this concentrate were added to 100 parts of ERL 4221 resin, the amount of zirconium acetylacetonate ranging from 0.48 to 1.3 parts per 100 parts of epoxy resin. The solutions gelled within 35 minutes at 160° C. but the resin solutions were still liquids after 341 days at room temperature.

EXAMPLE 17

Glycidyl ether epoxy resins were not gelled by zirconium acetylacetonate in the absence of phenolic accelerators. However, tough, clear solids were obtained by using solutions of glycidyl ether epoxy resins in ERL 4221 epoxy resins. The reactivity of the resins decreased as the glycidyl ether epoxy resin content was increased. Gel times at 160° C. of from 30 to 90 minutes were obtained with 1 part of zirconium acetylacetonate in mixtures of ERL 4221 and Epon 828 ranging from 90:10 to 50:50.

EXAMPLE 18

The cure of ERL 4221 epoxy resins by zirconium acetylacetonate was markedly accelerated by the addition of a phenolic compound. For example, to 100 parts of ERL 4221 and 1 parts of zirconium acetylacetonate were added 1 part and 2 parts respectively of catechol. These mixtures exothermed and gelled within 15 minutes at room temperature with 1 part by weight of catechol, and within 5 minutes at room temperature with 2 parts by weight of catechol.

EXAMPLE 19

Epon 828 epoxy resin containing from 1.0 to 3.0 parts of zirconium acetylacetonate did not gel after 3½ hours at 160° C. These solutions gelled within 40 minutes at 160° C. when 1 part of catechol was added.

The following Examples 20 and 21 demonstrate the extremely long retention of low initial viscosity of ERL 4221-zirconium acetylacetonate mixtures even after nearly one year at room temperature.

EXAMPLE 20

To a hundred parts of ERL 4221 were added 0.50, 0.75, 1.0, 1.5 and 2.0 parts respectively of zirconium acetylacetonate. The initial viscosity of each of the resin-catalyst mixtures ranged from 3.55 to 4.58 stokes at room temperature. The viscosity after 327 days at room temperature ranged from 12.9 to 15.25 stokes.

EXAMPLE 21

To a hundred parts of ERL 4221 was added a 90/10 mixture of Epon 828 and zirconium acetylacetonate. The Epon 828-zirconium acetylacetonate concentrate was added in 5.0, 7.5, 10.0, 12.5 and 15.0 parts respectively. This produced a resin-catalyst mixture containing 0.48, 0.70, 0.91, 1.11, 1.30 percent respectively of the zirconium acetylacetonate. The initial viscosity at room temperature ranged from 4.85 to 5.89 stokes. The viscosity after eight months at room temperature ranged from 7.56 to 9.77 stokes.

The excellent retention of low viscosity by ERl 4221-zirconium acetylacetonate and ERL 4221-Epon 828- zirconium acetylacetonate resins plus the high reactivity of these resins at elevated temperatures makes them potentially useful as Class F vacuum-pressure impregnation resins.

Epoxy resins cured in accordance with the invention have excellent dissipation factors, making them suitable for use in electrical insulation. The following Examples 22 thru 27 show the dissipation factor at 60 Hz (Hertz or cycles per second) and 10 VPM (volts per mil) vs. temperature for a number of epoxy resins cross-linked by metal acetylacetonates, or metal acetylacetonates plus a phenolic accelerator. The tan δ values (dissipation factor) were consistently low at 25° C. to at least 170°C.

EXAMPLE 22

To a hundred parts of ERL 4221 were added 0.25, 0.50, 0.75 and 1.0 parts respectively of aluminum acetylacetonate. One part of salicylaldehyde was also added to each of the ERL 4221-aluminum acetylacetonate resins. They were cured for four hours at 160° C. The dissipation factors were as follows:

| Temperature °C. | Tan δ (60 Hz., 10 VPM) |
| --- | --- |
| 25 | 0.0023 – 0.0030 |
| 100 | 0.0164 – 0.0175 |
| 130 | 0.0229 – 0.0306 |
| 160 | 0.0317 – 0.0342 |

EXAMPLE 23 to a hundred parts of ERL 4221 were added 1 part of aluminum acetylacetonate and 0.5, 1.0 and 2.0 parts respectively of catechol and then 2 parts of aluminum acetylacetonate and 0.5, 1.0 and 2.0 parts of catechol respectively. They were cured for 2 hours at 160° C. with the following dissipation factor results:

| Temperature °C. | Tan δ (60 Hz., 10 VPM) |
| --- | --- |
| 25 | 0.0050 – 0.0059 |
| 100 | 0.0131 – 0.0163 |
| 150 | 0.0256 – 0.0309 |
| 160 | 0.0276 – 0.0304 |

EXAMPLE 24

Tan δ vs. temperature results were obtained for the epoxy novolac DEN 438 cross-linked by aluminum acetylacetonate and catechol accelerator. The aluminum acetylacetonate was used in either one part or 1.5 parts. The catechol was added in amounts ranging from 2.5 to 4 parts. The resins were cured for 15 hours at 160° C. The tan δ values were consistently low (from 0.0019–0.0151) for temperatures from 25° to 160° C.

EXAMPLE 25

To a hundred parts of ERL 4221 were added 0.05 to 2.0 parts of zirconium acetylacetonate. The resins were cured for only 3 hours at 160° C. All gave low tan δ values at from 25° to 170° C.

EXAMPLE 26

Low tan δ values were also obtained by using liquid concentrates Epon 828-zirconium acetylacetonate (90/10 and 80/20) as hardeners for ERL 4221. The resins were cured at from 5 to 6 hours at 160° C. Again the dissipation factors as measured by tan δ were consistently low at temperatures from 25° to 160° C. The tan δ values ranged from a low of 0.0019 at 25° C. to a high of 0.0342 at 160° C.

EXAMPLE 27

Glycidyl ether epoxy resins required a peracid epoxy resin, e.g., ERL 4221, or a phenolic accelerator in order to be cured by zirconium acetylacetonate. Tan δ vs. temperature for an ERL 4221-Epon 828-zirconium acetylacetonate and an Epon 828-zirconium acetylacetonatecatechol resin were determined. The tan δ values ranged from 0.0026 at 25° C. to 0.0334 at 170° C.

Heat distortion temperatures at 264 psi were determined for a number of resin samples. Each of the samples was 5 inch × one-half × one-half inch. The samples tested included ERL 4221 cured with aluminum or zinc acetylacetonate with catechol; Epon 828 cured with aluminum acetylacetonate and catechol; DEN 438 cured with aluminum acetylacetonate and catechol; and ERL 4221 cured with titanium and then zirconium acetylacetonate. The heat distortion temperatures of many of the cured resins were high. It was found that the heat distortion temperatures of those samples which were relatively lower could be increased by either longer cure times or adjustment of the proportion of the acetylacetonate or the phenolic accelerator.

From the foregoing it will be evident that the invention provides a hardenable epoxy resin composition, the reactivity of which can be controlled over a wide range by the choice of epoxy resin, specific acetylacetonate catalyst, or by the addition of a phenolic accelerator. The compositions are particularly valuable because solventless, 1-part homogeneous resins can be formulated which are stable for as long as a year or even more at room temperature but which cure rapidly when heated to approximately 160° C. The cured resins exhibit good electrical properties at from 25° C. to at least 170° C. Their properties make them useful in Class F vacuum-pressure impregnation resins and in electrical grade prepregs (shaped tapes, fibers and cloth containing a resin), including micatape binders.

I claim:
1. A hardenable epoxy resin composition consisting of
   an epoxy resin having more than one 1,2-epoxy group per molecule and selected from the group consisting of cycloaliphatic epoxy resins, and a mixture containing respectively 50–90 parts by weight of cycloaliphatic epoxy resins and 50–10 parts by weight of glycidyl ethers of polyphenol epoxy resins, and
   from about 0.025 to 5.0 percent by weight of said epoxy resin of a metal acetylacetonate selected from the group consisting of titanium and zirconium acetylacetonate, having solely metal to oxygen bonds, as a catalytic hardener for said epoxy resin.
2. The hardenable epoxy resin composition of claim 1 in which the metal acetylacetonate is present in amounts from about 0.05 to 3.0 percent by weight of epoxy resin.
3. A hardenable epoxy resin composition consisting of
   an epoxy resin consisting of 1,2-epoxy groups and more than 1 epoxy group per molecule, and from about 0.025 to 5.0 percent by weight of said epoxy resin of a metal acetylacetonate, having solely metal to oxygen bonds, as a catalytic hardener for said epoxy resin, and consisting of 0.1 to 15.0 percent by weight of said epoxy resin of a phenolic accelerator.

4. The hardenable epoxy resin composition of claim 3 in which the metal acetylacetonate is selected from the group consisting of aluminum, titanium, zinc and zirconium acetylacetonate.

5. The hardenable epoxy resin composition of claim 3 in which the phenolic accelerator is selected from the group consisting of bisphenol A, catechol and resorcinol.

6. The hardenable epoxy resin composition of claim 3 consisting from about 0.5 to 10.0 percent of the phenolic accelerator.

7. A hardenable epoxy resin composition consisting of
an epoxy resin consisting of 1,2-epoxy groups and more than one epoxy group per molecule,
from about 0.05 to 3.0 percent by weight of said epoxy resin of a metal acetylacetonate, having solely metal to oxygen bonds, selected from the group consisting of aluminum, titanium, zinc, and zirconium acetylacetonate as a catalytic hardener for said epoxy resin, and
from about 0.5 to 10.0 percent by weight of said epoxy resin of a phenolic accelerator.

* * * * *